United States Patent [19]

Gill

[11] Patent Number: 5,609,668
[45] Date of Patent: Mar. 11, 1997

[54] SPILL CLEAN-UP PROCESS

[76] Inventor: Paul E. Gill, 2005 De La Cruz Blvd. #235, Santa Clara, Calif. 95050

[21] Appl. No.: 619,433

[22] Filed: Mar. 21, 1996

Related U.S. Application Data

[63] Continuation-in-part of Ser. No. 315,570, Sep. 30, 1994, Pat. No. 5,525,139.

[51] Int. Cl.$^6$ .................. B08B 7/00; C02F 1/28; C05F 11/02; C05F 11/08
[52] U.S. Cl. .................. 71/9; 71/24; 71/901; 71/903; 71/904; 134/7; 210/690; 210/691
[58] Field of Search .................. 71/9, 23, 24, 901, 71/903, 904; 435/262, 262.5, 264; 210/610, 611, 690, 691; 134/7

[56] References Cited

U.S. PATENT DOCUMENTS

| | | | |
|---|---|---|---|
| 4,164,405 | 8/1979 | Pinckard | 71/24 |
| 4,288,556 | 9/1981 | Belloc et al. | 435/265 |
| 4,849,360 | 7/1989 | Norris et al. | 435/264 |
| 5,525,139 | 6/1996 | Gill | 71/9 |

FOREIGN PATENT DOCUMENTS

| | | |
|---|---|---|
| 9115440 | 10/1991 | WIPO . |
| 9203393 | 3/1992 | WIPO . |

*Primary Examiner*—Ferris Lander
*Attorney, Agent, or Firm*—Norton R. Townsley

[57] ABSTRACT

The present invention is an improved process for absorbing and decontaminating an organic chemical spill comprising the steps of: partially composting plant material; mixing approximately 80% of the partially composted plant material with approximately 20% of dry plant material; inoculating the mixture with about 50 to 100 parts per million by weight of an organic chemical to form an absorbent; mixing the absorbent with about 20% to 40% by volume of spilled organic chemical; adding water; and allowing the mixture to incubate for a suitable time at ambient temperature until the organic chemical spill is neutralized. The plant material may be cotton gin trash or alfalfa hay; or cotton, legumes, alfalfa, tomatoes or their mixtures. The mixture of absorbent and spilled organic chemical may allowed to incubate in a perforated drum with a lid.

9 Claims, No Drawings

SPILL CLEAN-UP PROCESS

REFERENCE

This Application is a Continuation In Part Application for application Ser. No. 08/315,570, filed Sep. 30, 1994, and now U.S. Pat. No. 5,525,139, Jun. 11, 1996.

BACKGROUND OF THE INVENTION

The present invention relates the field of spill clean-up and more specifically to the bioremediation of unwanted chemical substances, such as petroleum hydrocarbons, which have been spilled onto the ground.

Certain agricultural soils, especially in the south, have grown crops almost continuously for more than 100 years. Such soils are now very low in organic matter content and are therefore generally infested with soil borne plant pathogenic fungi represented by the fungal species Rhizoctonia, Pythium and Fusarium among others (Crawford, J. L. 1975. Plant Disease Reporter, 56:373). Such soils are said to be "conducive" to plant disease causing agents. Experience teaches that such soils low in organic matter remain conducive to plant disease causing agents unless they are amended with a high nitrogen to carbon ratio plant compost material as disclosed in U.S. Pat. Nos. 4,164,405 and 4,229,442, issued to Pinckard, Aug. 14, 1979 and Oct. 21, 1980, respectively. Soils that have been cleansed of plant disease causing agents are said to be made "suppressive". More specifically such soils are also said to be "remediated" although the term currently refers to soils cleansed of unwanted chemical substances.

The Pinckard patent, U.S. Pat. No. 4,164,405, p.5, lines 13–15, states, "Organic type insecticidal poisons such as toxaphene, DDT, dieldrin or aldrin originally applied to the growing crop are removed". In that statement Pinckard was referring to the insecticidal residues remaining on the cotton crop waste after it had been separated from the seed and lint by the gin and before the plant material had been composted or otherwise disposed of.

While using multi-ton quantities of the above described compost for cleansing field crop soils that contained, in addition to plant disease causing agents, 200 ppm of DDT and its isomers, a large pile was left on a garden soil for several weeks before being scattered on the garden. While digging into the soil-compost mix Pinckard observed the mix was inhabited by earthworms which are known to be sensitive to the chlorinated aromatic hydrocarbon pesticides. Later tests demonstrated that soils contaminated with several unwanted chemical substances, including soil borne plant pathogens, could be cleansed, or remediated, by mixing with composted (treated) cotton gin waste (or trash) and that the same result could be obtained with composted alfalfa hay but not with cereal straw or common suburban leaf litter. The difference between the raw materials for composting appeared to be their carbon:nitrogen ratios. Those organic raw materials having C:N ratios of approximately 10:1 to 30:1 produced a compost suppressive of soil borne plant pathogens and at the same time, in due course, cleansed the soils of certain unwanted chemical entities. Further research led Pinckard to investigate the several well known details of the art of composting in relation to cleansing soils of unwanted entities. These improvements are disclosed in U.S. Pat. No. 5,100,455, which teaches how contaminated soils may be cleansed with composted high nitrogen to carbon ratio plant materials but not with ordinary plant materials or leaf litter such as cereal straw which have C:N ratios approaching 100:1 or more.

Leaking oil and chemical storage tanks and supply lines contaminate surrounding soils with petroleum hydrocarbons, industrial solvents and chemicals frequently harmful to man, animals and plants. Current environmental regulations demand such contaminated soils either be replaced with clean uncontaminated soil or cleansed of the contaminating entities. Several methods have been developed for the above purpose some of which have been described in U.S. patent documents and elsewhere.

Among the first U.S. patent documents reviewed was the Gorby patent, U.S. Pat. No. 2,947,619 issued Aug. 2, 1960 disclosing a process for composting wastes of several kinds by repeated aeration at temperatures of 50° to 70° C. and moisture contents of 40–60%. The Gorby patent while being a disclosure of the prior art bears no relation to the current invention for soil remediation.

The Varro, et al., U.S. Pat. No. 3,233,976, issued Feb. 8, 1966, discloses apparatus in which organic wastes are converted to fertilizer by aerobic fermentation. It is unrelated to this invention for soil remediation.

The Linn patent, U.S. Pat. No. 3,616,204, issued Oct. 26, 1971, discloses a method for soil restoration (bioremediation) after contamination with a petroleum hydrocarbon. The Linn patent discloses, as do several others, inoculating the contaminated soil with cultures of identified microorganisms known to degrade the unwanted contaminants while feeding such organisms appropriate nutrients under controlled laboratory conditions or in the field. The above described approach to soil remediation is likely to be impractical because of soil microbial competition as discussed by Alexander (Alexander, M. 1977. Soil Microbiology, P. 410, "microbial competition", John Wiley & Sons, New York). Many microorganisms compete with each other for nutrients, some protecting themselves by generating antibiotics and while the above hypothesis of soil remediation as delineated by Linn and others may be effective in a sterile substrate it has failed in numerous non sterile substrates as Alexander implies and as Pinckard's experience has confirmed.

The Durrell U.S. Pat. No. 3,762,910, issued Oct. 2, 1973, converts plant nutrients from the passive state to an active state by composting plant material in a trench. It bears no relation to soil remediation as disclosed in the current invention.

The Varro patent, U.S. Pat. No. 4,050,917, issued Sept. 27, 1977, discloses a process for composting waste in a heated environment on a series of moving belts and bears no relation to soil remediation.

The Pinckard patents, U.S. Pat. Nos. 4,164,405, issued Aug. 14, 1979, and 4,229,442, issued Oct. 21, 1980, disclosed how cotton crop waste may be cleansed of unwanted identified plant pathogens and chlorinated hydrocarbon insecticides by modified composting.

The Khoroshavin, et al., patent, U.S. Pat. No. 4,317,670, issued Mar. 2, 1982, teaches remediating industrial waste heaps by leveling, fertilizing, plowing, planting, watering and inoculating with common soil inhabiting fungi; nothing in this patent relates to the claims in this invention excepting well known methods of the art.

The Norris et al., patent, U.S. Pat. No. 4,849,360, issued Jul. 18, 1989, is one of the most recent patents issued for soil remediation. It discloses use of a container for soils contaminated with petroleum hydrocarbons through which air is forced wherein soil remediation depends upon the indigenous microflora after enrichment with phosphorus and nitrogen nutrients. A preferred embodiment comprises an open-topped pit with an impermeable liner and gas distributing means. Contaminated soil is introduced into the pit and air is introduced into the gas distributing means. Norris et al. teach sampling of the contaminated soil but only to determine moisture content and microbial counts before and after treatment.

U.S. Pat. No. 4,288,556 was issued Sep. 8, 1981 to Belloc et al. This patent describes a new microorganism which is capable of producing a new proteolytic enzyme. The enzyme has utility in the depilation of animal skins. In the patent, Belloc et al. describe testing the growth of the microorganism in different culture media. All the media are different types of agar (nutrient agar) and broths. Included, for example, are agar with yeast extract, oatmeal/tomato extract, and peptone/glucose. This patent describes a wholly new species. The growth media were only used for purposes of characterizing the new microorganism. To extrapolate the testing results of one organism to the entire field of composting is impossible.

International Patent Application No: WO 92/03393 was published Mar. 5, 1992. This Application reveals compositions for and methods of degrading organic chemicals in soil. The composition is a nutrient medium serving as a substrate for microorganisms in the soil. The nutrient medium is added to the soil to cause proliferation of microorganisms which are effective or which may become effective in degrading the organic chemical. Preferably the microorganisms are present in the soil, but useful microorganisms may also be added with the nutrient medium. This Application has nothing to do with composting and does not cover spill clean up using composts and perforated drums.

The Pinckard, et al., patent, U.S. Pat. No. 5,100,455 issued Mar. 31, 1992 is also a recent patent covering bioremediation. It discloses removal of unwanted chemicals and biological entities from soils. This is achieved by composting specifically selected plant groups and then mixing this compost with the contaminated soil. Although not specified, the compost is usually made at a site remote from the contaminated site.

In U.S. Pat. No. 5,100,455, Pinckard also details a process for absorbing and decontaminating a hydrocarbon or chlorinated hydrocarbon spill. The present invention is an improvement on U.S. Pat. No. 5,100,455.

After reviewing the U.S. patent documents mentioned above and some of the current literature on bioremediation of contaminated soils it is obvious that spill clean-up as taught by U.S. Pat. No. 5,100,455 suffers from serious deficiencies. The microorganisms that are grown in the special compost are specific to the site where the compost is made. These microorganisms are different from and may indeed be antagonistic to the microorganisms found at the spill site. This leads to inefficiency in decontamination and longer decontamination times.

Pinckard et al. claim a process for absorbing and decontaminating a hydrocarbon or chlorinated hydrocarbon spill comprising the steps of: composting plant material having a carbon:nitrogen ratio of 10:1 to 30:1; mixing the compost with about an equal volume of sawdust to form an absorbent; mixing the absorbent with up to 20% by volume of spilled hydrocarbon or chlorinated hydrocarbon; and allowing the mixture to stand for a suitable time at ambient temperature until the hydrocarbon or chlorinated hydrocarbon is decontaminated. The hydrocarbon or chlorinated hydrocarbon may be diesel fuel, oil, gasoline, aviation fuel, paint solvent, or trichloroethylene. The preferred addition ratio is about 50 ppm based on dry weight of the plant material.

Their invention takes advantage of the fact that certain microorganisms can digest toxicants and that the growth of such microorganisms can be encouraged by addition to the growth medium of small amounts of toxicants.

When compost, manufactured following the teachings of Pinckard et al., is used for spill clean-up, the growth of microorganisms that can digest the contaminants is encouraged. These microorganisms then digest the contaminants until the soil is cleansed of the contaminants. Pinckard et al. state: "Well known to microbiologists is the principle that some microorganisms will adapt to increasing concentrations of a specific toxicant if introduced to low dosages." This means that microorganisms will adapt to digest large quantities of specific chemicals if there is a low concentration of these chemicals in the growth medium to start with. It implies that to acclimatize microorganisms to a specific chemical one should treat the growth medium with a specific chemical. In fact that is just what Pinckard et al. teach.

What Pinckard et al. failed to recognize was that fully composted plant material contains organisms adapted to digest only certain chemicals. It will take time for the compost to encourage growth of a colony of specific contaminant digesting microorganisms sufficient to completely clean up a spill. Therefore, spill clean-up will proceed quite slowly. If, in addition, the compost contains microorganisms antagonistic to the microorganisms that can digest the contaminants at the spill site, soil cleansing may be further slowed.

Development of a method of spill clean-up which could overcome the inefficiencies of the method taught in U.S. Pat. No. 5,100,455 represents a great improvement in the field of bioremediation and would satisfy a long felt need of the environmnental engineer.

SUMMARY OF THE INVENTION

The present invention overcomes the deficiencies of the process disclosed by U.S. Pat. No. 5,100,455. The present invention provides a process for absorbing and decontaminating an organic chemical spill comprising the steps of:

(a) partially composting plant material;

(b) mixing approximately 80% of the partially composted plant material with approximately 20% of dry plant material;

(c) inoculating the mixture with about 50 to 100 parts per million by weight of an organic chemical to form an absorbent;

(d) mixing the absorbent with about 20% to 40% by volume of the spilled organic chemical;

(g) adding water;

(h) adding an aqueous mixture of nitrate and phosphate salts; and (i) allowing the mixture to incubate for a suitable time at ambient temperature until the organic chemical spill is neutralized.

By selecting certain plant materials, by allowing them to partially compost, by adding a percentage of dry plant material, by inoculating the mixture with a small amount of an organic chemical, and by adding nitrate and phosphate salts a biologically active absorbent is generated. When mixed with the spilled chemical and water, this biologically active absorbent will neutralize the spill.

An appreciation of the other aims and objectives of the present invention and a more complete and comprehensive understanding of it may be achieved by studying the following description of a preferred embodiment.

DETAILED DESCRIPTION OF THE PREFERRED EMBODIMENT

In harvesting cotton, large machine pickers harvest the crop and in so doing gather weeds, grasses, soil particles, even small rocks. The crop is then transported to a gin where the seed, fiber and debris are separated. The debris or waste, also known as trash, was at one time incinerated but now is accumulated during the harvest season and usually disposed of in dumps and land fills because it contains pesticidal residues.

Cotton gin trash is unique; for years the cotton crop has been sprayed and dusted with pesticides, defoliants and harvest aid chemical formulated from xenobiotic chemicals, oils and industrial solvents contaminating both the crop residue and soil. The soil microflora and fauna, being repeatedly exposed to low dosages of such chemicals, are known to adapt to and utilize these carboniferous compounds, transforming several insecticides such as DDT to end products harmless to soil inhabiting earthworms and fungus gnats.

Before soil bioremediation can proceed a special compost must be prepared. For ease of manufacture and to take advantage of economies of scale, the compost is typically prepared at a site remote from the contaminated site. The dry waste from the gin is arranged in windrows of indefinite lengths 2 to 12 feet wide and 1 to 4 feet high, but preferably 6 to 8 feet wide and 2 to 3 feet high to accommodate practical materials handling equipment. Samples of soil are gathered from numerous places at the contaminated site and at areas immediately adjacent to it. Since the soil samples are specific to the contaminated site from which they are taken, the cumulative soil sample is called "site-specific". This site-specific sample is then mixed into the dry waste prior to composting. The ratio is immaterial.

The site-specific sample contains natural inhibiting microflora from the contaminated site in its uncontaminated state, contaminants from the contaminated site, and microorganisms that are acclimated to the contaminants at the contaminated site. The air dry mass of inoculated trash is then composted by conventional techniques. If desired iron sulfate, ammonium nitrate and manganese oxide can be added into the water applied, for the purpose of encouraging growth and reproduction of the microflora and fauna naturally present in the inoculated trash. It has recently been theorized that manganese oxide assists certain organisms in breaking down humic substances. The pH balance should be approximately 6.5 to 7.0, preferably 6.8 and may be adjusted with sulfur or calcium as needed.

Well known to microbiologists is the principle that some microorganism will adapt to increasing concentrations of a specific toxicant if introduced to low dosages. In the present disclosure the above principle is employed by inoculating the trash with a site specific soil sample prior to composting. In this way in is possible to force the microorganisms to adapt to the specific contaminants or mixture of contaminants present at the contaminated site and adjust to or overcome protective organisms. Doing this it is unnecessary to add specific chemicals such as diesel fuel or dichloroethylene, which may or may not be present at the contaminated site.

The preferred method of composting is to mix, move or turn the mass with appropriate materials handling equipment to allow air penetration and to avoid over-heating. Repeated applications of water, with repeated mixing should be continued at weekly intervals, more or less, until the individual plant parts such as bracts, seed and stem material are no longer easily identified; the time required being approximately three months in early spring weather, less in midsummer and more in winter.

The special oxidative microflora and microfauna present in the high nitrogen to carbon plant materials used for bioremediation have been partially identified. However, they represent only a very small number of the total kinds and numbers of microorganisms known to be present. The humic end product brought in intimate contact with the contaminated soil normally contains totals of at least $1\times10^8$ individuals per gram of compost. Of the many genera present the following have been tentatively identified:

| | |
|---|---|
| Achromobacter | Proteus |
| Arthrobacter | Pseudomonas |
| Aspergillus | Pythium |
| Azotobacter | Rhizotonia |
| Bacillus | Rhizopus |
| Cunninghamella | Saccharomyces |
| Fusarium | Sclerotium |
| Mucor | Streptomyces |
| Norcordia | Trichoderma |
| Penicillium | Verticillium |
| Phanerochete | Xanthomonas |

In addition to the above named organisms, also present were numerous kinds of free living nematodes, protozoa, algae, yeasts, mites and the larvae of the fungus gnat (Sciara, family Mycetophylidae). Degradation of the raw plant material starts with invasion of the "opportunistic" fungi, Rhizopus, Mucor, Aspergillus and Penicillium, among others. These fungi are followed by Sciara, the bacteria, nematodes, protozoa and algae. A small group of Basidiomycetes representing the fleshy fungi appear next. Finally the Actinomycetes and Pseudomonas species, among others, dominate the composted humic substance.

During the decomposition of plant materials the above ecological succession of microbial inhabitants mutually support and compete with each other and in so doing transform a large number of complex organic carbon bearing chemical substances into harmless end products supportive to higher plant life. The process includes mineralization of the carbon in the contaminating compounds or degradation by co-metabolism, or both, induced by the microbial consortia occupying the composted plant material.

A leguminous crop or other similar plant, such as rice hulls, may be substituted for the cotton crop, or its residue, cotton gin trash. For bioremediation of soils to be successful, within reasonable time periods, it is essential that the oxidative microflora, naturally present in and on the plant materials, be encouraged to increase in both kinds and numbers and that they must be sustained for long periods of time, an example being 3 or 4 months.

The above procedure is intended to increase the kinds and numbers of oxidative microorganisms in the original plant remains, and to increase and to condition or acclimatize them to accept and degrade the unwanted contaminants present at the contaminated site. Residues of DDT, dieldrin and toxaphene as well as other aliphatic and aromatic compounds such as the petroleum hydrocarbons and industrial solvents are remediated by the present invention.

The instant invention is an improvement on the Pinckard et al. invention. The instant invention provides a process for absorbing chemicals spilled on a hard surface. The key to this modification is to provide a biologically active material that will absorb and then biologically neutralize the spilled chemical. The absorbent is made by obtaining the dry plant materials described above, allowing them to partially compost, adding about 20% of dry plant material, inoculating the mixture with about 50 to 100 parts per million by weight of an organic chemical, and adding nitrate and phosphate salts.

Partial composting is defined as allowing the composting process to continue, as described above, until some of the individual plant pans such as bracts, seed and stem material can still be identified. The preferred organic chemical is DDT, dieldrin, toxaphene, 1,1,1-trichloroethane, 1,1-dichloroethane, trans-1,2-dichloroethene, trichloroethylene, methylene chloride, a petroleum fuel hydrocarbon or any mixture of them. This makes a biologically active absorbent in a biological process similar to that described above.

When mixed with the spilled chemical and some water, this biologically active absorbent will neutralize the spill in a manner similar to that described for soil remediation above. If desired, the absorbent and the spilled chemical can be placed in a perforated drum, with a lid, for incubation.

Nowhere in the Pinckard et al. patent is use of a perforated drum with a lid disclosed for containing spill clean up materials. Pinckard et al. do mention "materials handling equipment" but it is quite clear from context that Pinckard et al. are talking about mixing windrows of compost. What Pinckard et al. are talking about are bulldozers and similar equipment not perforated drums.

It can be seen from the above that the Applicant's invention is a distinct improvement on the Pinckard et al. invention in that it provides for more rapid spill clean-up. Also, the Applicant's invention solves problems not recognized in the Pinckard et al. invention. These problems are: 1) that the compost may not contain microorganisms capable of digesting the spilled contaminant and 2) the compost may contain microorganisms actually antagonistic to the contaminant digesting microorganism.

The invention has been described with reference to a particular embodiment. However, it should be obvious to those skilled in the art to which this invention pertains that other modifications and enhancements can be made without departing from the spirit and scope of the claims that follow.

What is claimed is:

1. A process for absorbing and decontaminating an organic chemical spill comprising the steps of:
    a. partially composting plant material;
    b. mixing approximately 80% of said partially composted plant material with approximately 20% of dry plant material;
    c. inoculating the mixture with about 50 to 100 parts per million by weight of an organic chemical selected from the group consisting of residues of ethylene glycol, 1,1,1-trichloroethane, 1,1-dichloroethane, trans-1,2-dichloroethene, trichloroethylene, methylene chloride, petroleum fuel hydrocarbons and their mixtures to form an absorbent;
    d. mixing said absorbent with about 20% to 40% by volume of said spilled organic chemical;
    e. adding water;
    f. adding an aqueous mixture of a nitrate salt and a phosphate salt; and
    g. allowing the mixture to incubate for a suitable time at ambient temperature until said organic chemical spill is neutralized.

2. The process of claim 1 in which said plant material is selected from the group consisting of cotton, legumes, alfalfa, tomatoes, rice hulls and their mixtures.

3. The process of claim 1 in which said plant material is cotton gin trash.

4. The process of claim 1 in which said plant material is alfalfa hay.

5. The process of claim 1 in which said plant matial is rice hulls.

6. The process of claim 1 in which said spilled organic chemical is selected from the group consisting of diesel fuel, oil, gasoline, aviation fuel, paint solvent, trichloroethylene and their mixtures.

7. The process of claim 1 in which the mixture of said absorbent and said spilled organic chemical is allowed to incubate in a perforated drum with a lid.

8. The process of claim 1 in which said ammonium salt is ammonium nitrate.

9. The process of claim 1 in which said phosphate salt is diammonium phosphate.

* * * * *